United States Patent [19]

Brown

[11] 3,892,733

[45] July 1, 1975

[54] CYCLOPENTANE DERIVATIVES

[75] Inventor: Edward Douglas Brown, Macclesfield, England

[73] Assignee: Imperial Chemical Industries Limited, London, England

[22] Filed: Jan. 17, 1973

[21] Appl. No.: 324,429

[30] Foreign Application Priority Data

Feb. 4, 1972 United Kingdom.................. 5353/72

[52] U.S. Cl........... 260/240 R; 260/343.3; 260/464; 260/514 D; 260/544 R; 260/586 R; 260/611 A

[51] Int. Cl............................................. C07d 5/04

[58] Field of Search........ 260/240 R, 343.3, 240 PG

[56] References Cited
UNITED STATES PATENTS 3,711,515  1/1973  Kelly............................... 260/343.3
3,755,426  8/1973  Strike et al. ..................... 260/514 D
3,778,450  12/1973 Axen................................ 260/343.3
3,778,461  12/1973 Brown et al. .................... 260/343.3

Primary Examiner—Randolph John D.
Attorney, Agent, or Firm—Cushman, Darby & Cushman

[57] ABSTRACT

The disclosure relates to novel iodocyclopentane derivatives, for example 2,3,3a$\beta$,6a$\beta$-tetrahydro-5$\alpha$-hydroxy-4$\beta$-(3-hydroxyoct-1-trans-enyl)-6$\beta$-iodo-2-oxocyclopenteno [b] furan, which are useful in the preparation of known diol intermediates, for example 2,3,3a$\beta$,6a$\beta$-tetrahydro-5$\alpha$-hydroxy-4$\beta$-(3-hydroxyoct-1-trans-enyl)-2-oxo-cyclopenteno[b]furan.

13 Claims, No Drawings

CYCLOPENTANE DERIVATIVES

This invention relates to cyclopentane derivatives which are valuable intermediates for the manufacture of prostaglandins and prostaglandin-like compounds which possess useful pharmacological properties. In a known synthesis of prostaglandins and prostaglandin-like compounds the initial stages of the synthetic sequence comprise:

a. the addition of thallium cyclopentadienide to chloromethyl benzyl ether to give 5-benzyl-oxymethyl-1,3-cyclopentadiene I, which is b. subjected to the Diels-Alder reaction with 2-chloroacryloyl chloride.

c. The bicyclic acid chloride II thus produced is converted to the corresponding acyl azide, which on heating undergoes Curtius rearrangement to the isocyanate. The isocyanate is hydrolysed to the bicyclic ketone III, which is d. subjected to Baeyer-Villiger oxidation to a bicyclic lactone IV.

e. The lactone is saponified and iodinated to give a rearranged iodo-lactone V, which is f. acylated with p-phenylbenzoyl chloride and the produced acyloxy lactone VI is g. de-iodinated to give the benzyloxymethyl lactone VII.

h. The benzyloxymethyl lactone VII is hydrogenolysed to the hydroxy-methyl lactone VIII, which is i. oxidised to the aldehyde lactone IX, which is converted to a prostaglandin or a prostaglandin-like compound in conventional manner.

This known reaction sequence is unsuited to the large-scale manufacture of prostaglandins or prostaglandin-like compounds for several reasons, of which the more important are:

1. the need to recover and recycle the thallium, together with its toxicity, make the use of thallium undesirable on a large scale;
2. the low temperature of $-22°C$. at which the thallium cyclopentadienide is alkylated with chloromethyl benzyl ether is inconvenient, and uneconomic for large scale manufacture;
3. the presence of the carcinogenic bis-(chloromethyl) ether as an impurity in chloromethyl benzyl ether makes this compound unsuitable for use in large scale manufacture; and
4. the reductive debenzylation of the lactone VII requires the use of a palladium catalyst and a pressure of hydrogen of 45 p.s.i., both of which are undesirable for use on a large scale.

In a modification of the earlier stages of this process described in our co-pending U.S. Pat. No. 3,778,461 and application Ser. No. 238,968, now U.S. Pat. 3,790,632 granted Feb. 5, 1974, which avoids these disadvantages, $\alpha$-acetoxyfulvene is reacted in a Diels-Alder reaction with, for example, 2-chloroacrylonitrile to give the bicyclo [2,2,1]heptene derivative X which is hydrolysed to give the anti-aldehyde XI, the anti-aldehyde is isomerised to the syn-aldehyde* XII, either by acid, or in the presence of an amine. The syn-aldehyde XII is reacted with trimethyl orthoformate to give the dimethyl acetal, which on reaction with 1,2-xylen-$\alpha,\alpha'$-diol yields the corresponding 1,2-xylen-$\alpha,\alpha'$-diyl acetal XIII. The acetal XIII is hydrolysed with potassium hydroxide in dimethylsulphoxide to the ketone XIV which is subjected to Baeyer-Villiger oxidation with m-chloroperbenzoic acid to the lactone XV.

*anti-refers to a substituent lying on the opposite side of the bridgehead to the double bond; syn-refers to a substituent on the same side of the bridge-head.

Lactone XV is saponified with sodium hydroxide, neutralised with acetic acid and the product treated

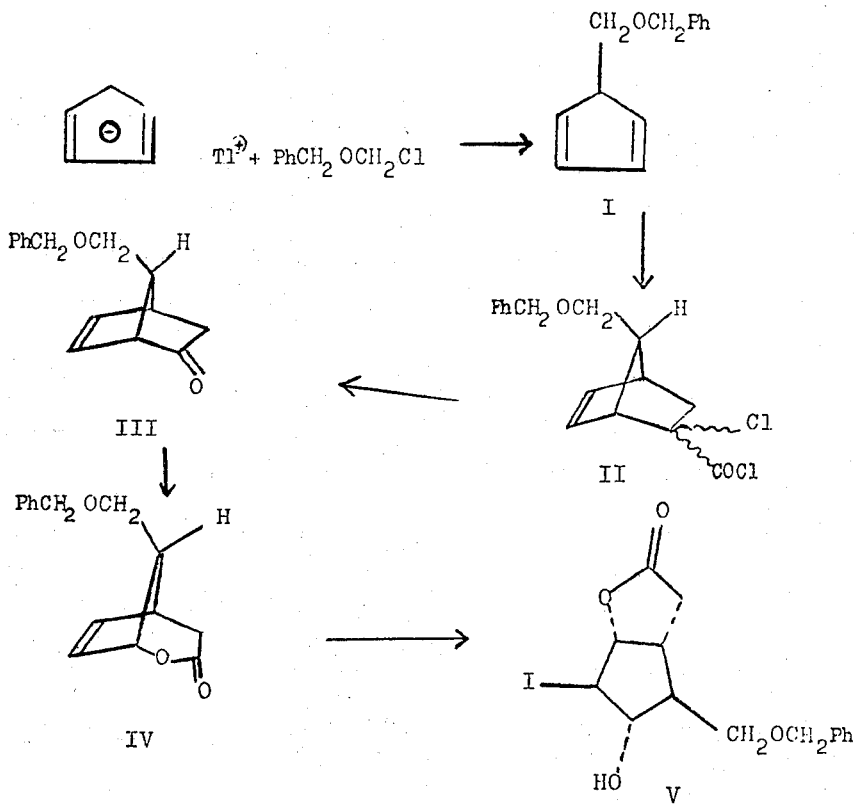

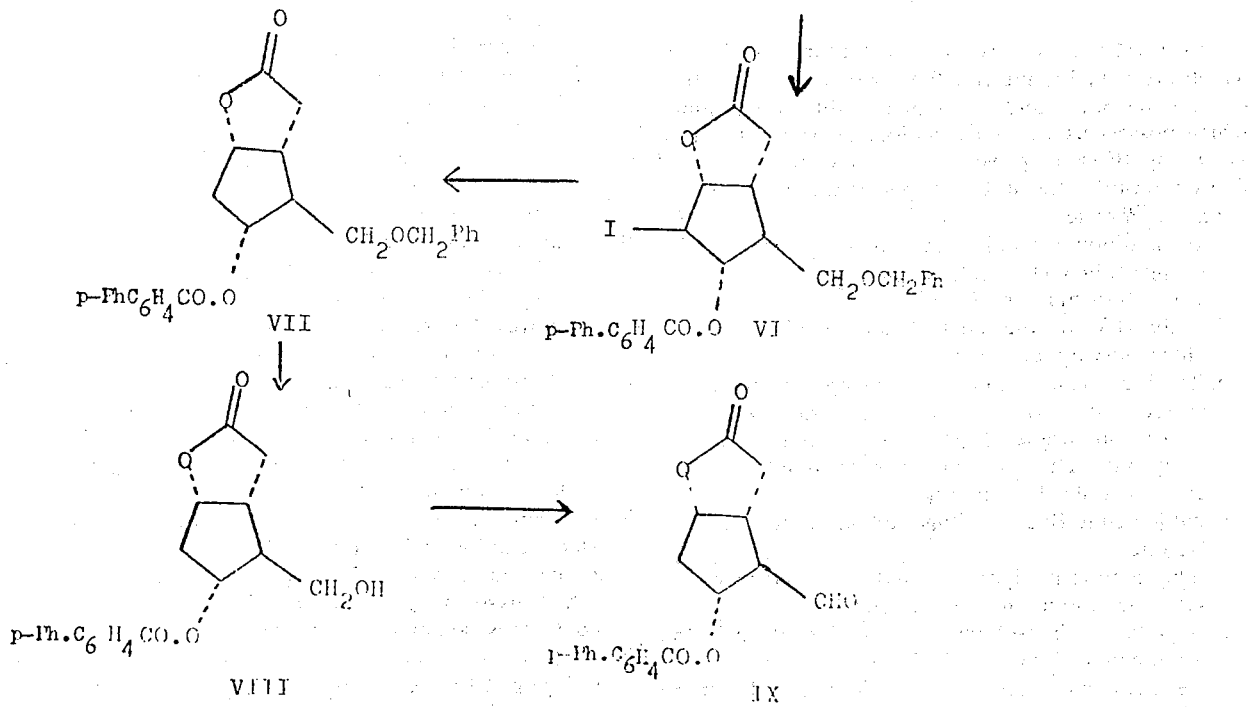

with potassium tri-iodide to give an iodohydrin XVI, which is reacted with p-phenylbenzoyl chloride to give the ester XVII. The ester XVII is treated with tributyl tin hydride to give the de-iodinated lactone XVIII, hydrogenolysis of which removes the acetal grouping to give the aldehyde XIX ($R^1$=p-phenylbenzoyl). The aldehyde XIX ($R^1$=p-phenylbenzoyl) is reacted with a phosphonate of the formula $(CH_3O)_2P^+O. C^-H.CO.R^2$ wherein —CH:CH.CH(CH)$R^2$ represents from C-13 onwards of a prostaglandin or prostaglandin-like side chain) to give an unsaturated ketone XX, which is reduced with zinc borohydride to an enol XXI, and the protecting p-phenylbenzoyl group is removed with potassium carbonate in methanol to give the diol XXIIa, which is converted to a prostaglandin or prostaglandin-like compound in conventional manner, or which is hydrogenated to the diol XXIIb which is converted similarly.

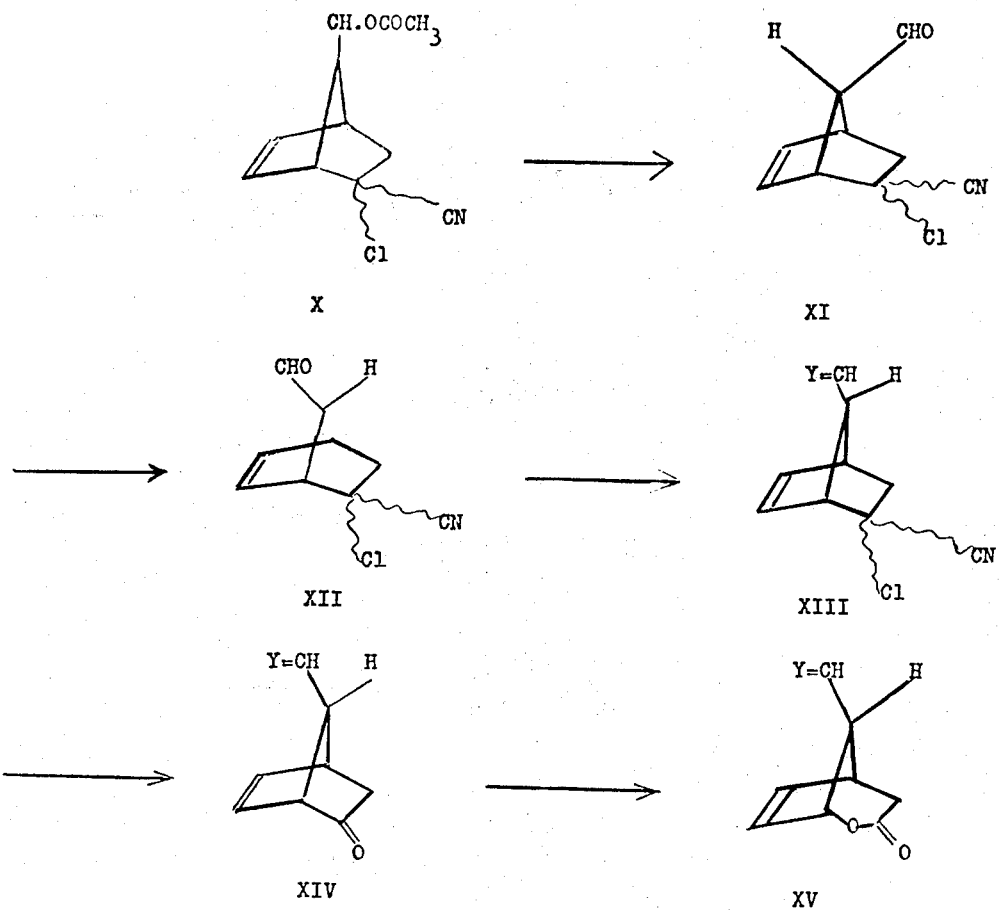

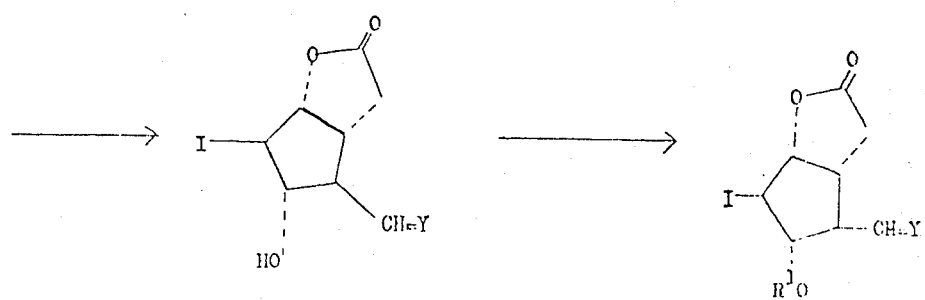
XVI  XVII
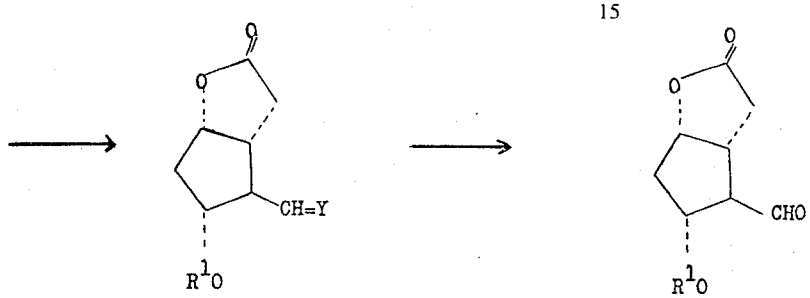
XVIII  XIX
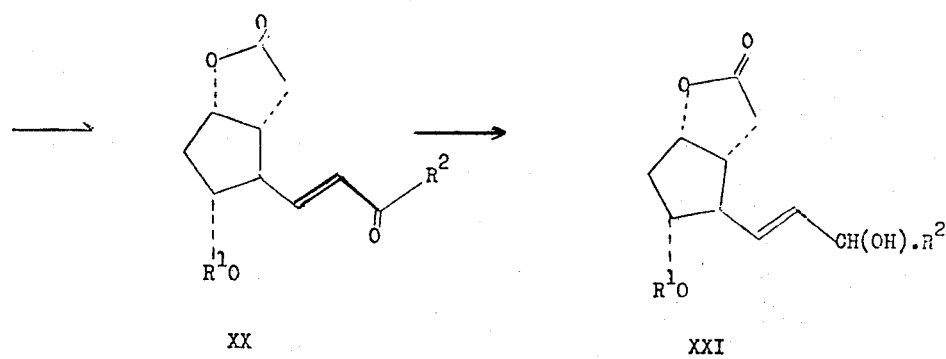
XX  XXI
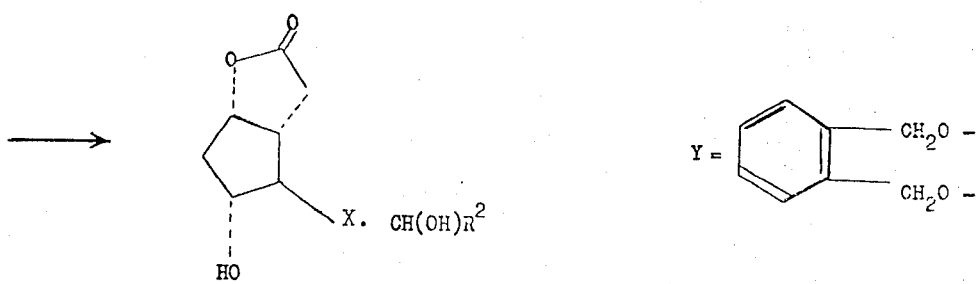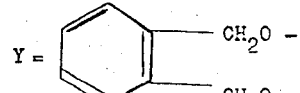
XXII  a) X = trans-vinylene
      b) X = ethylene.
We have now found, and herein is our invention, that the conversion of the syn-aldehyde XII to the diol XXII can be shortened considerably by reacting the aldehyde XII directly with a phosphonate reagent of the formula $(CH_3O)_2P^+O.C^-H.COR^2$, thus avoiding the need to protect the said aldehyde as an acetal, and involving a novel, key iodohydrin intermediate.

Thus, according to the invention there is provided a cyclopentane derivative of the formula:-

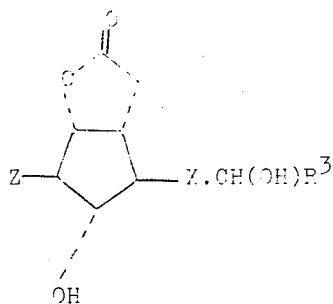

wherein X is an ethylene or trans-vinylene radical, Z is a chlorine, bromine or iodine atom, and $R^3$ is a branched or unbranched alkyl or alkenyl radical of 4 to 10 carbon atoms; a radical of the formula $-A^1.OR^4$, wherein $A^1$ is an alkylene radical of 1 to 9 carbon atoms and $R^4$ is an alkyl radical of 1 to 9 carbon atoms or a cycloalkyl radical of 5 to 7 carbon atoms, provided that $A^1$ and $R^4$ together contain not more than 10 carbon atoms; a radical of the formula $-A^2R^5$, wherein $A^2$ is an alkylene radical of 2 or 3 carbon atoms, optionally bearing 1 or 2 alkyl substituents each of 1 to 4 carbon atoms, and $R^5$ is an aryl radical which is unsubstituted or which is substituted by halogen atoms, nitro radicals, alkyl, halogenoalkyl, or alkoxy radicals each of 1 to 3 carbon atoms or dialkylamino radicals wherein each alkyl is of 1 to 3 carbon atoms; or a radical of the formula $-A^3.A^4.R^6$, wherein $A^3$ is an alkylene radical of 1 to 3 carbon atoms bearing as substituents 0, 1 or 2 alkyl radicals each of 1 to 3 carbon atoms, $A^4$ is an oxygen or sulphur atom, a sulphinyl radical or an alkylimino radical of up to 4 carbon atoms, and $R^6$ is an aryl, benzyl or furfuryl radical optionally substituted by hydroxy, nitro or phenyl radicals, halogen atoms, alkyl, alkenyl, halogenoalkyl, alkoxy, alkenyloxy, or acylamino radicals of 1 to 4 carbon atoms or dialkylamino wherein each alkyl is of 1 to 3 carbon atoms.

A suitable value for $R^3$ when it is an alkyl or alkenyl radical of 4 to 10 carbon atoms is, for example, the n-pentyl, n-heptyl or cis-pent-2-enyl radical.

A suitable value for $A^1$ when it is an alkylene radical of 1 to 9 carbon atoms is a straight-chain such radical, for example the methylene, ethylene, trimethylene, tetramethylene or pentamethylene radical, and a suitable value for $R^4$ is, for example, the methyl, ethyl, n-propyl, n-butyl, isobutyl, n-pentyl or n-hexyl radical. Suitable values for the group $-A^1.OR^4$ wherein $A^1$ and $R^4$ together contain not more than 10 carbon atoms are therefore, for example, the n-propoxymethyl, n-butoxymethyl, isobutoxymethyl, n-pentyloxymethyl, n-hexyloxymethyl, 2-n-butoxyethyl, 3-n-propoxypropyl, 4-ethoxybutyl and 5-methoxypentyl radicals.

A suitable value for $A^2$ is the ethylene, trimethylene, 1-methylethylene [$-CH(CH_3).CH_2-$], 1-ethylethylene [$-CH(C_2H_5).CH_2-$], 2-methylethylene [$-CH_2.CH(CH_3)-$] or 1,1-dimethylethylene [$-C(CH_3)_2.CH_2-$] radical, and a suitable value for $R^5$ when it is an aryl radical, optionally substituted, is for example a phenyl or naphthyl radical optionally substituted. Suitable halogen substituents in $R^5$ are, for example, chlorine, bromine or fluorine atoms. Suitable alkyl or alkoxy substituents of 1 to 3 carbon atoms in $R^5$ are, for example, methyl, ethyl, methoxy or ethoxy radicals, and suitable halogenoalkyl substituents of 1 to 3 carbon atoms in $R^5$ are, for example, chloroalkyl or fluoroalkyl radicals, for example trifluoromethyl radicals. Suitable dialkylamino substituents in $R^5$ are, for example, dialkylamino radicals wherein the two alkyl radicals are the same, for example the dimethylamino radical. Suitable substituted aryl radicals are therefore, for example, chlorophenyl, bromophenyl, fluorophenyl, chloronaphthyl, tolyl, trifluoromethylphenyl, ethoxyphenyl, nitrophenyl, dimethylaminophenyl and tetrahydronaphthyl radicals. Preferred aryl radicals contain not more than two substituents as defined above. Particular values for $R^5$ are, therefore, the phenyl, 2-naphthyl, 3- and 4-chlorophenyl, 2- and 4-fluorophenyl, 3,4-dichlorophenyl and 3-trifluoromethylphenyl radicals.

A suitable value for $A^3$ when it is an alkylene radical of 1 to 3 carbon atoms bearing as substituents 0, 1 or 2 alkyl radicals, each of 1 to 3 carbon atoms is, for example a methylene, ethylene or trimethylene radical bearing 0, 1 or 2 methyl substituents, for example the methylene, ethylidene, isopropylidene and trimethylene radicals.

A suitable value for $A^4$ when it is an alkyleneimino radical of up to 4 carbon atoms is, for example, the methylimino radical.

A suitable value for $R^6$ when it is an aryl radical, optionally substituted, is for example a phenyl or naphthyl radical optionally substituted. Suitable halogen atom substituents in $R^6$ are, for example, chlorine, bromine or fluorine atoms. Suitable alkyl, alkoxy, alkenyl or alkenyloxy substituents of 1 to 4 carbon atoms in $R^6$ are, for example methyl, t-butyl, allyl, methoxy or allyloxy radicals. Suitable halogenoalkyl substituents of 1 to 4 carbon atoms in $R^6$ are, for example chloroalkyl or fluoroalkyl radicals, for example trifluoromethyl radicals. Suitable dialkylamino radicals wherein each alkyl is of 1 to 3 carbon atoms, which may be substituents in $R^6$ are, for example, dialkylamino radicals wherein the two alkyl radicals are the same, for example the dimethylamino radical. Suitable substituted aryl radicals are for example, chlorophenyl, chloronaphthyl, bromophenyl, fluorophenyl, tolyl, xylyl, methylnaphthyl, t-butylphenyl, methylchlorophenyl, trifluoromethylphenyl, hydroxyphenyl, methoxyphenyl, methoxynaphthyl, biphenylyl, dimethylaminophenyl and tetrahydronaphthyl radicals. Preferred aryl radicals contain not more than two substituents as defined above. Particular values for $R^6$ are, therefore, the phenyl, benzyl, furfuryl, 1-naphthyl, 2-naphthyl, 2-, 3- and 4-chlorophenyl, 4-bromophenyl, 2 -, 3- and 4-fluorophenyl, 2,3-, 2,4-, 2,5-, 2,6-, 3,4- and 3,5-dichlorophenyl, 2-, 3- and 4-tolyl, 2,3-, 3,4- and 3,5-xylyl, 4-t-butylphenyl, 3-allylphenyl, 3-trifluoromethylphenyl, 4-hydroxyphenyl, 2-, 3- and 4-methoxyphenyl, 4-biphenylyl, 3-dimethylaminophenyl, 2-chloro-4-methylphenyl, 1-chloro-2-naphthyl, 4-chloro-2-naphthyl, 6-methyl-2-naphthyl, 6-methoxy-2-naphthyl and 5,6,7,8-tetrahydro-2-naphthyl radicals.

It is to be understood that the above formula XXIII encompasses the racemate and either enantiomer, and also compounds wherein the side-chain hydroxyl radical is in either the α- or the β- configuration.

A preferred group of cyclopentane derivatives of the invention comprises those compounds wherein $R^3$ is a branched or unbranched alkyl radical of 4 to 10 carbon atoms, and more especially, those compounds wherein $R^3$ is an unbranched alkyl radical of 4 to 8 carbon atoms. Particular preferred compounds are 2,3,3a$\beta$,6a-$\beta$-tetrahydro-5$\alpha$-hydroxy-4$\beta$-(3-hydroxydec-1-trans-enyl)-6$\beta$-iodo-2-oxo-cyclopenteno[b] furan and 2,3,3-a$\beta$,6a$\beta$-tetrahydro-5$\alpha$-hydroxy-4$\beta$-(3-hydroxyoct-1-trans-enyl)-6$\beta$-iodo-2-oxocyclopenteno[b]furan.

A further group of preferred cyclopentane derivatives of the invention comprises those compounds wherein $R^3$ is a radical of the formula —$A^2R^5$, wherein $A^2$ is an alkylene radical of 2 or 3 carbon atoms and $R^5$ is a phenyl radical which is unsubstituted or is substituted by a halogen atom. A preferred halogen atom substituent is a chlorine atom. A particular preferred compound of the invention within this group is 2,3,3a-$\beta$,6a$\beta$-tetrahydro-5$\alpha$-hydroxy-4$\beta$-(3-hydroxy-4-methyl-5-phenylpent-1-transenyl)-6$\beta$-iodo-2-oxocyclopenteno[b]furan.

A further preferred group of cyclopentane derivatives of the invention comprises those compounds wherein $R^3$ is a radical of the formula —$A^3.A^4.R^6$, wherein $A^3$ is the methylene radical, $A^4$ is an oxygen atom and $R^6$ is a phenyl radical which is unsubstituted or is substituted by a halogen atom or a halogenoalkyl radical. Preferred halogen atom substituents are chlorine and fluorine atoms, and a preferred halogenoalkyl substituent is the trifluoromethyl radical. Such a chlorine, fluorine or trifluoromethyl radical is preferably in the meta- or para-position of the phenyl ring. A particular preferred compound of the invention within this group is 4$\beta$-(4-p-chlorophenoxy-3-hydroxybut-1-trans-enyl)-2,3,3a$\beta$,6a$\beta$-tetrahydro-5$\alpha$-hydroxy6$\beta$-iodo-2-oxocyclopenteno[b]-furan.

According to a further feature of the invention there is provided a process for the manufacture of the novel cyclopentane derivative of the formula XXIII which comprises the reaction of a cyclopentenylacetic acid derivative of the frmula:-

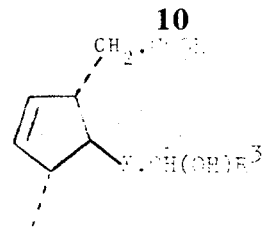

XXIV or a salt thereof, wherein $R^2$ and X have the meanings stated above, with an aqueous chlorinating, brominating or iodinating agent.

A suitable chlorinating, brominating or iodinating agent may be, for example, produced by adding the required halogen or the corresponding N-halogenosuccinimide to an aqueous reaction medium, or it may be for example hypochlorous acid or a derivative thereof, for example the sodium salt, or it may be an alkali metal tri-iodide, for example potassium tri-iodide.

The cyclopentenylacetic acid derivative of the formula XXIV wherein X is a vinylene radical which is used as starting material in the above process may be obtained by reacting 5-chloro-5-cyanobicyclo[2,2,1]hept-2-ene-7-syn-carboxaldehyde XII with a phosphonate reagent of the formula $(CH_3O)_2P^+O.C^-H.COR^3$ to give an enone XXV which is reduced with either zinc borohydride or aluminium triisopropoxide to the enol XXVI. The chloronitrile group is hydrolysed to the ketone XXVII which is submitted to Baeyer-Villiger oxidation to the lactone XXVIII, hydrolysis of which gives the required cyclopentenylacetic acid XXIV. Alternatively, the hydroxyl group of the ketone XXVII is esterified to give XXIX ($R^8$ = acetyl, p-phenylbenzoyl or tetrahydropyran-2yl), before Baeyer-Villiger oxidation of the ester to a lactone XXX (R as above) and hydrolysis thereof to the same cyclopentenylacetic acid XXIV. Esterification of the hydroxyl group is thought to suppress oxidation of the side-chain double-bond during the Baeyer-Villiger oxidation step.

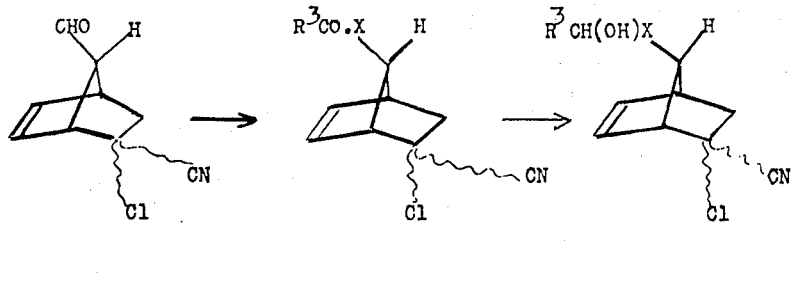

XII          XXV          XXVI

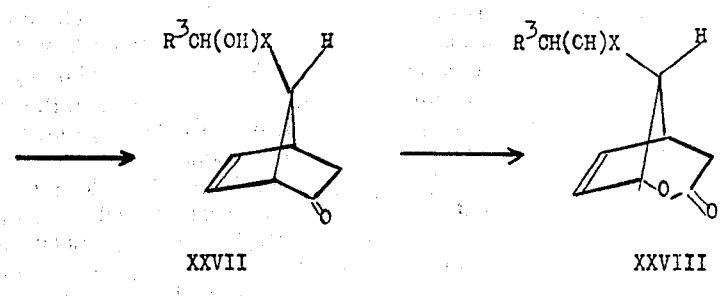

XXVII          XXVIII

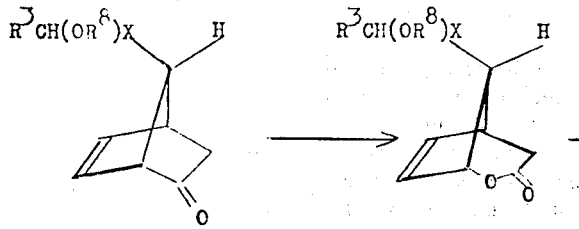

XXIX   XXX

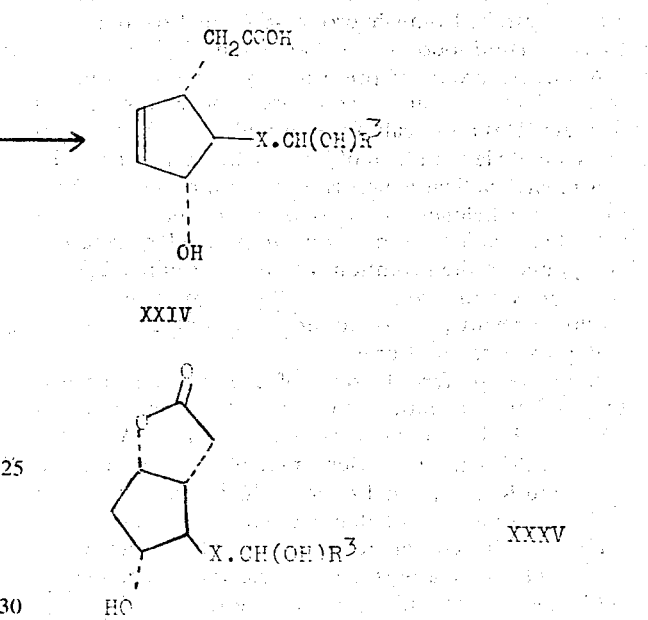

XXIV

XXXV wherein X and R³ have the meanings stated above, in

Alternatively, the ketone XVII may be obtained from the syn-aldehyde XII by conversion thereof to an acetal, for example the dimethylacetal XXXI, which is saponified to convert the chloronitrile group to an oxo group, giving a keto-acetal, XXXII, which is hydrolysed to a keto-aldehyde XXXIII. The keto-aldehyde reacts selectively with a phosphonate reagent $(CH_3O)_2PO^+$.-$CH^-.COR^3$ on the aldehyde carbonyl to give a keto-enone XXXIV, which may be selectively reduced with di-isobornyloxy aluminium isopropoxide to give the enol-ketone XXVII (X = vinylene)

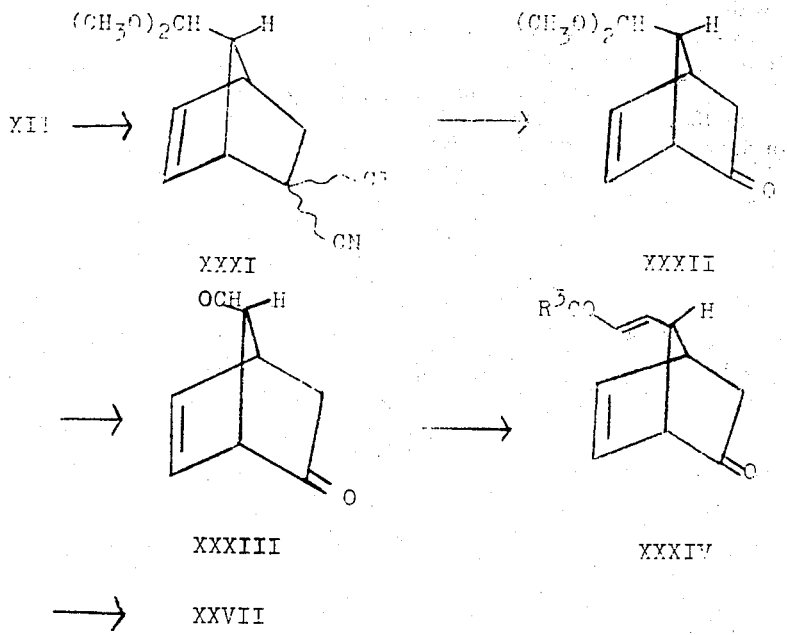

XXXI   XXXII

XXXIII   XXXIV

⟶ XXVII

The starting material of the formula XXIV wherein X is an ethylene radical, used in the process of the invention, may be obtained by hydrogenating an unsaturated ketone XXV (X = vinylene) in the presence of 5% palladium-on-carbon catalyst, to give a saturated ketone XXV (X = ethylene) and repeating the procedure outlined above using the saturated ketone in place of the unsaturated ketone.

According to a further feature of the invention there is provided the use of a cyclopentane derivative of the invention for the manufacture of a known intermediate, (of the formula:- the manufacture of prostaglandins and prostaglandin-like compounds, which comprises the hydrogenolysis of said cyclopentane derivative of the invention, for example with tri-n-butyl tin hydride, sodium borohydride in dimethylsulphoxide, Raney nickel and hydrogen, or sodium cyanoborohydride ($Na.BH_3CN$) in hexamethylphosphoramide.

The invention is illustrated but not limited by the following examples. ($R_F$ values refer to thin layer chromatography on silica gel plates supplied commerically by Merck of Darmstadt, and the spots were visualized by spraying with a solution of ceric ammonium nitrate in sulphuric acid, followed by heating and, if appropriate, examination under U.V. light).

EXAMPLE 1

A solution of sodium [4α-hydroxy-5β-(3-hydroxydec-1-trans-enyl)cyclopent-2-en-1α-yl]acetate (0.22 mmole) in aqueous dioxan (1:1, 1 ml.) was cooled in ice, and an ice-cold solution of potassium iodide (332mg., 2.0 mmole) and iodine (168 mg., 0.66 mmole) in water (0.7ml.) was added. The mixture was stirred at 0°C. for 18 hrs., the excess of iodine was destroyed by the addition of solid sodium bisulphate, and the resulting solution was extracted with ethyl acetate (4×2 ml). The combined extracts were dried, and the solvent was evaporated under reduced pressure to give 2,3,3aβ,6aβ-tetrahydro-5α-hydroxy-4β-(3-hydroxydec-1-trans-enyl)-6β-iodo-2-oxocyclopenteno[b]furan (XXIII), $R_f$=0.4, (40% ethyl acetate in methylene dichloride). The n.m.r. spectrum in deuteriochloroform showed the following characteristic bands (δ values)

0.86, 3H, triplet, methyl.
3.81, 2H, singlet, hydroxy.
4.00, 3H, multiplet, >CH.OH and >CHI
5.01, 1H, multiplet, 6aβ proton.
5.55, 2H, multiplet, olefinic protons.

The solution of sodium salt used as starting material may be obtained as follows:

A solution of dimethyl 2-oxononylphosphonate (354 mg., 1.4 mmole) in anhydrous 1,2-dimethoxyethane (3.5 ml.) at −78°C. was treated with n-butyl-lithium (0.94 ml. of a 1.32M solution in hexane), and the mixture was stirred for 10 mins. To this mixture was added a solution of 5-chloro-5-cyanobicyclo[2,2,1]hept-2-ene-7-syn-carboxaldehyde (XII, 203mg. 1.1 mmole) in 1.1-dimethoxyethane (2ml.). The reaction mixture was then allowed to warm up to room temperature and after being stirred for 1 hr. was neutralised with glacial acetic acid. The solvents were evaporated under reduced pressure, and the residue was chromatographed on "Florisil," (trade mark) using methylene dichloride as eluant, to yield the enone, 5-chloro-5-cyano-7-syn-(3-oxodec-1-trans-enyl)bicyclo [2,2,1]hept-2ene. $R_f$=0.3 (methylene dichloride).

The n.m.r. spectrum in deuteriochloroform showed the following characteristic features (δ values):-

0.85, 3H, triplet, methyl group
1.55, 2H, broad triplet, —CO.CH$_2$—CH$_2$—
2.45, 2H, triplet, —CO—CH$_2$—CH$_2$—
6.10, 2H, doublet on multiplet, =CH.CO— and C-3 olefinic proton
6.38, 1H, multiplet, C-2 olefinic proton
6.7, 1H, multiplet, —CO—CH=CH—

A solution of the enone (102 mg. 0.33 mmole) and aluminium tri-isopropoxide (684 mg. 3.3 mmole) in benzene/isopropanol (3:1)(8 ml.) was heated in a bath at 80°C. Solvent was allowed to distil from the mixture, and was continuously replaced with benzene/isopropanol (3:1). After 5 hrs., the reaction mixture was cooled, stirred with saturated aqueous sodium hydrogen tartrate solution (25 ml.) for 10 mins., and diluted with brine/water (1:1)(5 ml.). The mixture was extracted with ethyl acetate (4×5 ml.), the combined extracts were dried and the solvent was evaporated under reduced pressure to give the enol, 5-chloro-5-cyano-7-syn-(3-hydroxydec-1-trans-enyl)bicyclo[2,2,1]hept-2-ene, $R_F$ ≈ 0.2(methylene dichloride).

The n.m.r. spectrum in deuteriochloroform showed the following characteristic features (δvalues)

0.84, 3H, triplet, methyl
1.5–2.9, 2H, multiplet, C—6 protons
3.95, 1H, broad, >CH(OH)
5.51, 2H, multiplet, —CH=CH.CH(OH)—
6.02, 1H, multiplet, ⎫
6.32, 1H, multiplet, ⎬ C—2 and C—3 protons To a solution of the enol (243 mg., 0.179 mmole) in dimethyl sulphoxide (2.4 ml.) was added an aqueous solution of potassium hydroxide (8.6N, 0.19 ml., 1.7 mmole), and the resulting mixture was stirred for 18 hrs., in an inert atmosphere. The reaction mixture was then diluted with water (5 ml.) and extracted with ether (4×5 ml.). The combined extracts were washed with water (2×3 ml.) and dried, and the solvent was evaporated under reduced pressure to yield the enol ketone, 7-syn-(3-hydroxydec-1-trans-enyl)-bicyclo[2,2,1]hept-2-en-5-one, $R_f$=0.3 (10% ethylacetate in methylene dichloride). The n.m.r. spectrum in deuteriochloroform showed the following characteristic features (δvalues):

0.87, 3H, triplet, methyl
2.00, 2H, multiplet, C—6 protons
3.99, 1H, multiplet, >CH(OH)
5.6, 2H, multiplet, —CH=CH.CH(OH)—
5.90, 1H, multiplet, ⎫
6.41, 1H, quartet, ⎬ C—2 and C—3 protons The enol ketone (58 mg., 0.22 mmole) was dissolved in dioxan (0.5 ml.), 10% sodium hydroxide solution (0.28ml., 0.66 mmole) was added, and the mixture was cooled to 0°C. with stirring. 30% Hydrogen peroxide solution (0.08 ml., 0.68 mmole) was added, and the mixture was stirred at 0°C. for 1 hr. The pH of the solution was adjusted to 7.4 with glacial acetic acid to yield a solution of sodium [4α-hydroxy-5β-(3-hydroxydec-1-trans-enyl)cyclopent-2-en-1α-yl]acetate in aqueous dioxan. This product was not isolated, but was used directly as the starting material.

Alternatively, 7-syn-(3-hydroxydec-1-trans-enyl) bicyclo[2,2,1]hept-2-en-5-one (104 mg., 0.4 mmole) was dissolved in a mixture of dry pyridine (1 ml.) and acetic anhydride (0.5 ml.) and the solution was allowed to stand at room temperature. After 4 hrs., the solvents were evaporated under reduced pressure, the residue was dissolved in methylene dichloride (10 ml.) and this solution was washed successively with hydrochloric acid (2 ml. of 1N) and saturated sodium bicarbonate solution (2 ml.). The organic layer was then dried and the solvent was evaporated under reduced pressure to yield the enol acetate, 7-syn-(3-acetoxydec-1-trans-enyl)bicyclo[2,2,1]hept-2-en-5-one $R_f$=0.7 (10% ethyl acetate in methylene dichloride).

The n.m.r. spectrum in deuteriochloroform showed the following characteristic features (δvalues):-

0.87 3H, triplet, —CH$_2$.CH$_3$
2.00, 5H, singlet, —CO.CH$_3$ and C—6 protons
5.14, 1H, quartet, =CH—CH—O—
5.6, 2H, multiplet, —CH=CH.CH—O—
5.94, 1H, quartet, ⎫
6.40, 1H, quartet, ⎬ C—2 and C—3 protons The enol acetate (88 mg., 0.29 mmole) was dissolved in methylene dichloride (3 ml.) that had been stored over solid sodium bicarbonate. The solution was stirred and cooled to 0°C., and solid sodium bicarbonate (46mg., 0.54 mmole) and m-chloroperbenzoic acid (53 mg., 0.31 mmole) were added. The mixture was then stirred at 0°C. for 30 hrs., after which time saturated sodium sulphite solution (0.5 ml.) was added, followed by saturated sodium bicarbonate solution (3 ml.). The organic layer was removed and the aqueous solution was extracted with methylene dichloride (2×3 ml.). The combined organic extracts were dried, and the solvent was evaporated under reduced pressure to yield 4α-hydroxy5β-(3-hydroxydec-1-trans-enyl)cyclopent-2-en-1α-ylacetic acid lactone $R_f$=0.4 (5% ethyl acetate in methylene dichloride).

The n.m.r. spectrum in deuteriochloroform, showed the following characteristic features (δvalues):-

0.84, 3H, triplet, methyl
1.96, 3H, singlet, acetoxy
4.78, 1H, broad singlet, 4β proton 5.45, 2H, multiplet,        —C$\underline{H}$=C$\underline{H}$—CHO—
6.20, 1H, multiplet,  ⎫
                              ⎬ C—2 and C—3 protons
6.37, 1H multiplet,   ⎭

The lactone (85 mg., 0.217 mmole) was dissolved in dioxane (1 ml.), 10% sodium hydroxide solution (0.32 ml., 0.81 mmole) was added, and the mixture was stirred at room temperature for 18 hrs. The solution was then cooled to 0°C., brought to pH 7.4 with glacial acetic acid to give a solution of sodium [4α-hydroxy-5β-(3-hydroxydec-1-trans-enyl)cyclopent-2-en-1α-yl]acetate in aqueous dioxan, which was used as starting material without further purification.

EXAMPLE 2

2,3,3aβ,6 aβ-Tetrahydro-5α-hydroxy-4β-(3-hydroxydec-1-trans-enyl)-6β-iodo-2-oxocyclopenteno[b]furan (XXIII) (25 mg., 0.06 mmole) and tri-n-butyl tin hydride (19 mg., 0.065 mmole) were dissolved in anhydrous benzene (3 ml.), and the resulting solution was heated under reflux for 24 hrs. The benzene was evaporated under reduced pressure, and the residual oil was triturated with n-pentane (5×2 ml.), and then chromatographed on a Florisil column using ether/methanol (1:1) as eluant to yield 2,3,3aβ,6aβ-tetrahydro-5α-hydroxy-4β-(3-hydroxydec-1-trans-enyl)-2-oxocyclopenteno[b]furan, $R_f$=0.2(40% ethyl acetate in methylene dichloride). The n.m.r. spectrum in deuteriochloroform showed the following characteristic features (δvalues):-

0.86, 3H, triplet, methyl.
2.8, 2H, broad, hydroxy(exchangeable with $D_2O$)
3.95, 2H, multiplet, >C$\underline{H}$(OH)
4.87, 1H, multiplet, 6α proton
5.45, 2H, multiplet, olefinic protons The product was indentical in all respects with an authentic sample prepared by a known route.

EXAMPLE 3

The process described in Example 1 was repeated, using sodium [4α-hydroxy-5β-(3-hydroxyoct-1-trans-enyl) cyclopent-2-en-1α-yl] acetate in place of the 3-hydroxydecenyl compound, to give 2,3,3aβ,6aβ-tetrahydro-5α-hydroxy-4β-(3-hydroxyoct-1-trans-enyl)-6β-iodo-2-oxocyclopenteno[b] furan, $R_f$=0.3(50% ethyl acetate in methylene dichloride).

The n.m.r. spectrum in deuteriochloroform showed the following characteristic peaks (δvalues):-

3.5, 2H, broad, 2 hydroxyls
4.05, 3H, multiplet, >C$\underline{H}$OH and >C$\underline{H}$I
5.1, 1H, multiplet, C-6a proton
5.6, 2H, multiplet, olefinic protons.

The solution of the sodium salt used as starting material was prepared by the process described in the second part of Example 1, via the following intermediates: the enone, $R_F$ = 0.35 (methylene dichloride). The n.m.r. spectrum in deuteriochloroform showed the following characteristic peaks (δvalues):-

0.9, 3H, triplet, methyl
1.1–1.8, 6H, multiplet, —COCH$_2$(C$\underline{H}_2$)$_3$CH$_3$
6.0–6.8, 4H, multiplet, olefinic protons;
the enol, $R_f$=0.35(5% ethyl acetate in methylene dichloride). The n.m.r. spectrum in deuteriochloroform showed the following characteristic peaks (δvalues):-

4.0, 1H, multiplet, —C$\underline{H}$(OH)C$_5$H$_{11}$
5.6, 2H, multiplet, side-chain olefinic protons
6.1, 1H, multiplet, ⎫
                              ⎬ C—2 and C—3 protons;
6.35, 1H, multiplet, ⎭ the enol ketone, $R_f$=0.25 (10% ethylacetate in methylene dichloride). Characteristic n.m.r. peaks (67 values) in deuteriochloroform;

0.90, 3H, methyl group
2.05, 2H, —C$\underline{H}_2$.CO—
3.05, 2H, bridgehead protons
4.0, 1H, —C$\underline{H}$OH
5.5–6.5, 4H, olefinic protons.

EXAMPLE 4

The process repeated in Example 2 was repeated, using 2,3,3aβ,6aβ-tetrahydro-5α-hydroxy-4β-(3-hydroxyoct-1-trans-enyl)-6β-iodo-2-oxocyclopenteno[b]furan in place of the corresponding 3-hydroxy-decenyl compound, to give 2,3,3aβ,6aβ-tetrahydro-5α-hydroxy-4β-(3-hydroxyoct-1-trans-enyl)-2-oxocyclopenteno-[b]furan, $R_f$=0.23 and 0.27 (ethyl acetate). The n.m.r. spectrum in deuteriochloroform showed the following characteristic peaks (δvalues):-

1.7-2.05, 1H, multiplet ⎫ C-3, C-3a, C-4 and
2.1-2.9, 5H, multiplet ⎭ C-6 protons
4.0, 2H, multiplet, >C$\underline{H}$(OH)

The mass spectrum of the bis-(trimethylsilyl) derivatives showed M$^+$ = 412.2474 (calculated for C$_{21}$H$_{40}$O$_4$Si$_2$, M$^+$ 432 412.2465). The product was indentical by thin layer chromatography, n.m.r. and mass spectrum with an authentic sample.

EXAMPLE 5

The process described in Example 1 was repeated using sodium [4α-hydroxy-5β-(3-hydroxy-4-methyl-5-phenylpent-1-trans-enyl)cyclopent-2-en-1α-yl] acetate in place of the 3-hydroxydecenyl compound to give 2,-3,3aβ,6aβ-tetrahydro-5α-hydroxy-4β-(3-hydroxy-4-methyl-5-phenyl-pent-1-trans-enyl)-6β-iodo-2-oxocyclopenteno[b]furan, $R_f$=0.38(50% ethyl acetate in methylene dichloride).

The solution of the sodium salt used as starting material was prepared by the process described in the second part of Example 1, via the following intermediates:- the enone, $R_f$=0.5 (methylene dichloride). The n.m.r. spectrum in deuteriochloroform showed the following characteristic peaks (δvalues):-

1.1, 3H, doublet, methyl.
5.9–6.8, 4H, multiplet, olefinic protons.
7.2, 5H, multiplet, aromatic;
the enol, $R_f$=0.15 (methylene dichloride). The n.m.r. spectrum in deuteriochloroform showed the following characteristic peaks ($\delta$values);-
  5.5, 2H, multiplet, side-chain olefinic protons
  7.2, 5H, multiplet, aromatic;
the enol ketone, $R_f$=0.25 (10% ethylacetate in methylene dichloride).

EXAMPLE 6

The process repeated in Example 2 was repeated using 2,3,3a$\beta$,6a$\beta$-tetrahydro-5$\alpha$-hydroxy-4$\beta$-(3-hydroxy-4-methyl-5-phenyl-pent-1-trans-enyl)-6$\beta$-iodo-2-oxocyclicpenteno[b]furan in place of the corresponding 3-hydroxy-decenyl compound to give 2,3,3a$\beta$,6a$\beta$, tetrahydro-5$\alpha$-hydroxy-4$\beta$-(3-hydroxy-4-methyl-5-phenyl-pent-1-trans-enyl)-2-oxocyclopenteno-[b]furan, $R_F$ = 0.30 and 0.27 (ethyl acetate). The n.m.r. spectrum in deuteriochloroform showed the following characteristic peaks ($\delta$values):-
  0.8, 3H, multiplet, methyl
  4.0, 2H, multiplet, >C$\underline{H}$(OH)
  4.8, 1H, multiplet, C-6a proton
  5.5, 2H, multiplet, olefinic protons
  7.3, 5H, multiplet, aromatic
The mass spectrum of the bis-(trimethylsilyl) derivative showed M $^+$ = 460.2465 (calculated for $C_{23}H_{40}O_4Si_2$, M $^+$ = 460.2460).

EXAMPLE 7

The process described in Example 1 was repeated using sodium [4$\alpha$-hydroxy-5$\beta$-(3-hydroxy-4-p-chlorophenoxybut-1-trans-enyl)cyclopent-2-en-1$\alpha$-yl] acetate in place of the 3-hydroxydecenyl compound, to give 2,3,3a$\beta$,6a$\beta$tetrahydro-5$\alpha$-hydroxy-4$\beta$-(3-hydroxy-4-p-chlorophenoxybut-1-trans-enyl)-6$\beta$-iodo-2-oxocyclopenteno[b]furan, $R_F$ = 0.4 (50% ethyl acetate in methylene dichloride). The n.m.r. spectrum in deuteriochloroform showed the following characteristic peaks ($\delta$values):-
  2.0–3.0, 4H, multiplet, C-3,C-3a and C-4 protons
  3.8–4.1, 4H, multiplet, C-5,C-6 and —C$\underline{H}_2$O— protons
  4.5, 1H, multiplet, side chain >C$\underline{H}$(OH)
  5.1, 1H, multiplet, C-6a proton
  5.8, 2H, multiplet, olefinic protons.

The solution of the sodium salt used as starting material was prepared by the process described in the second part of Example 1, via the following intermediates:- the enone $R_F$ = 0.45 (methylene dichloride). The n.m.r. spectrum in deuteriochloroform showed the following characteristic peaks ($\delta$values):-
  4.61, 2H, singlet, —C$\underline{H}_2$O
  6.1–7.5, 8H, multiplet, olefinic and aromatic protons.
the enol, $R_F$= 0.2 (methylene dichloride). The n.m.r. spectrum in deuteriochloroform showed the following characteristic peaks ($\delta$values):-
  3.8, 2H, multiplet, —C$\underline{H}_2$.O—
  4.4, 1H, multiplet, side chain >C$\underline{H}$(OH)
  5.7, 2H, multiplet, side-chain olefinic protons.
  6.1–6.4, 2H, multiplet, C-2 and C-3 protons.
  6.8–7.3, 4H, multiplet, aromatic;
the enol ketone, $R_f$=0.30 (10% ethylacetate in methylene dichloride). Characteristic n.m.r. peaks ($\delta$values) in deuteriochloroform;-
  2.0, 2H, multiplet, —C$\underline{H}_2$.CO—
  3.0, 2H, multiplet, bridgehead protons
  3.8, 2H, multiplet, —C$\underline{H}_2$.O—
  5.4–7.4, 8H, olefinic and aromatic protons.

EXAMPLE 8

The process repeated in Example 2 was repeated using 2,3,3a$\beta$,6a$\beta$-tetrahydro-5$\alpha$-hydroxy-4$\beta$-(3-hydroxy-4-p-chlorophenoxy-but-1-trans-enyl)-6$\beta$-iodo-2-oxocyclo-penteno[b]furan in place of the corresponding 3-hydroxy-decenyl compound to give 2,3,3a$\beta$, 6a$\beta$-tetrahydro-5$\alpha$-hydroxy-4$\beta$-(3-hydroxy-4-p-chlorophenoxybut-1-trans-enyl)-2-oxocyclopenteno[b]furan, $R_f$=0.3 (ethyl acetate). The n.m.r. spectrum in deuteriochloroform showed the following characteristic peaks ($\delta$valves):
  2.2–2.7, 6H, multiplets, C-3, C-3a, C-4 and C-6 protons.
  3.9, 2H, multiplet, —C$\underline{H}_2$.O—
  5.6, 2H, multiplet, olefinic protons
  6.5–7.3, 4H, multiplet, aromatic protons.
The product was indentical by thin layer chromatography and n.m.r. with an authentic sample.

What we claim is:-
1. A cyclopentane derivative of the formula:-

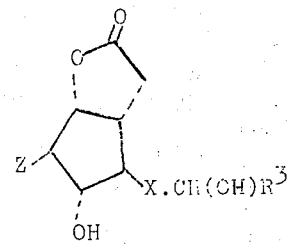

wherein X is ethylene or trans-vinylene, Z is chlorine, bromine or iodine and $R^3$ is alkyl or alkenyl of 4 to 10 carbon atoms, or a group —$A^1OR^4$ wherein $A^1$ is alkylene of 1 to 9 carbon atoms and $R^4$ is alkyl of 1 to 9 carbon atoms or cycloalkyl of 5 to 7 carbon atoms, $A^1$ and $R^4$ together containing not more than 10 carbon atoms, or $R^3$ is a group –$A^2R^5$ wherein $A^2$ is alkylene of 2 to 5 carbon atoms which is unsubstituted or is substituted by 1 or 2 alkyl of 1 to 4 carbon atoms and $R^5$ is aryl which is unsubstituted or is substituted by halogen; nitro; alkyl, halogenoalkyl or alkoxy each of 1 to 3 carbon atoms; or dialkylamino wherein each alkyl is of 1 to 3 carbon atoms, or $R^3$ is a group —$A^3.A^4.R^6$ wherein $A^3$ is alkylene of 1 to 3 carbon atoms bearing 0,1 or 2 alkyls of 1 to 3 carbon atoms, $A^4$ is oxygen, sulphur, sulphinyl or alkylimino of up to 4 carbon atoms, and $R^6$ is aryl, benzyl or furfuryl which is unsubstituted or substituted by hydroxy; nitro; phenyl; halogen; alkyl, alkenyl, halogenoalkyl, alkoxy, or alkenyloxy each of 1 to 4 carbon atoms; or dialkylamino wherein each alkyl is of 1 to 3 carbon atoms.

2. The cyclopentane derivative of claim 1 wherein X and Z have the meanings given in claim 1, and $R^3$ is alkyl or alkenyl of 4 to 10 carbon atoms, a group —$A^1$.$OR^4$ wherein $A^1$ is methylene, ethylene, trimethylene, tetramethylene, or pentamethylene, and $R^4$ is methyl, ethyl, n-propyl, n-butyl, isobutyl, n-pentyl or n-hexyl, $A^1$ and $R^4$ together containing not more than 10 carbon atoms, or $R^3$ is a group —$A^2R^5$ wherein $A^2$ is ethylene, trimethylene, 1-methylethylene, 2-methylethylene or 1,1-dimethylethylene and $R^5$ is phenyl or naphthyl, unsubstituted or bearing not more than two substituents selected from chlorine, bromine, fluorine, methyl, ethyl, methoxy, ethoxy, trifluoromethyl and dimethylamino, or $R^3$ is a group $—A^3.A^4.R^6$ wherein $A^3$ is methylene, ethylene, ethylidene, isopropylidene or trimethylene, $A^4$ is oxygen, sulphur, sulphinyl or methylimino, and $R^6$ is phenyl or naphthyl which is unsubstituted or which bears not more than two substituents selected from chlorine bromine, fluorine, methyl, t-butyl, allyl, methoxy, allyloxy, trifluoromethyl or dimethylamino.

3. The cyclopentane derivative of claim 1 wherein X and Z have the meanings stated in claim 1, $R^3$ is n-pentyl, n-heptyl, cis-pent-2-enyl, n-propoxymethyl, n-butoxymethyl, isobutoxymethyl, n-pentyloxymethyl, n-hexyloxymethyl, 2-n-butoxyethyl, 3-n-propoxypropyl, 4-ethoxybutyl or 5-methoxypentyl, or $R^3$ is a group $—A^2R^5$ wherein $A^2$ is the ethylene, trimethylene, 1-methylethylene, 2-methylethylene or 1,1-dimethylethylene and $R^5$ is phenyl, 2-naphthyl, 3- or 4-chlorophenyl, 2- or 4-fluorophenyl, 3,4-dichlorophenyl, or 3-trifluoromethylphenyl, or $R^3$ is a group $—A^3.A^4.R^6$ wherein $A^3$ is methylene, ethylene, ethylidene, isopropylidene or trimethylene, $A^4$ is oxygen, sulphur, sulphinyl or methylimino and $R^6$ is phenyl, benzyl, furfuryl, 1-naphthyl, 2-naphthyl, 2-,3- or 4-chlorophenyl, 4-bromophenyl, 2-,3- or 4-fluorophenyl, 2,3-, 2,4-, 2,5-, 2,6-, 3,4- or 3,5-dichlorophenyl, 2-, 3- or 4-tolyl, 2,3-, 3,4- or 3,5-xylyl, 4-t-butylphenyl, 3-allylphenyl, 3-trifluoromethylphenyl, 4-hydroxyphenyl, 2-, 3- or 4-methoxyphenyl, 4-biphenylyl, 3-dimethylaminophenyl, 2-chloro-4-methylphenyl, 1-chloro-2-naphthyl, 4-chloro-2-naphthyl, 6-methyl-2-naphthyl, 6-methoxy-2-naphthyl or 5,6,7,8-tetrahydro-2-naphthyl.

4. The cyclopentane derivative of claim 1 wherein X and Z have the meanings given in claim 1 and $R^3$ is straight chain alkyl of 4 to 8 carbon atoms.

5. The cyclopentane derivative of claim 1 wherein X and Z have the meanings given in claim 1 and $R^3$ is a group $—A^2R^5$ wherein $A^2$ is alkylene of 2 or 3 carbon atoms which bears 0,1 or 2 alkyls of 1 to 4 carbon atoms, and $R^5$ is phenyl or halogen substituted phenyl.

6. The cyclopentane derivative of claim 1 wherein X and Z have the meanings given in claim 1 and $R^3$ is a group $—A^3.A^4.R^6$ wherein $A^3$ is methylene, $A^4$ is oxygen and $R^6$ is phenyl, or phenyl substituted by chlorine fluorine or trifluoromethyl.

7. 2,3,3a$\beta$,6a$\beta$-Tetrahydro-5$\alpha$-hydroxy-4$\beta$-(3-hydroxy-dec-1-trans-enyl)-6$\beta$-iodo-2-oxocyclopenteno[b]furan.

8. 2,3,3a$\beta$,6a$\beta$-Tetrahydro-5$\alpha$-hydroxy-4$\beta$-(3-hydroxy-oct-1-trans-enyl)-6$\beta$-iodo-2-oxocyclopenteno[b]furan.

9. 2,3,3a$\beta$,6a$\beta$-Tetrahydro-5$\alpha$-hydroxy-4$\beta$-(3-hydroxy-4-methyl-5-phenylpent-1-trans-enyl)-6$\beta$-iodo-2-oxocyclopenteno[b]furan.

10. 4$\beta$-(4-p-Chlorophenoxy-3-hydroxybut-1-trans-enyl)-2,3,3a$\beta$,6a$\beta$-tetrahydro-5$\alpha$-hydroxy-6$\beta$-hydroxy-6$\beta$-iodo-2-oxocyclopenteno[b]furan.

11. A cyclopentane derivative of the formula:-

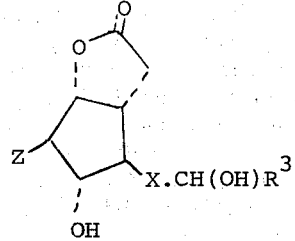

wherein X is ethylene or trans-vinylene, Z is chlorine, bromine or iodine and wherein $R^3$ is a group $—A^3.A^4.R^6$ wherein $A^3$ is alkylene of 1 to 3 carbon atoms, bearing 0,1 or 2 alkyls of 1 to 3 carbon atoms, $A^4$ is oxygen, and $R^6$ is phenyl or naphthyl which is unsubstituted or which bears not more than two substituents selected from chlorine, bromine, fluorine, trifluoromethyl or alkyl or alkoxy each of 1 to 4 carbon atoms.

12. The cyclopentane derivative of claim 11 wherein $A^3$ is methylene, ethylene, ethylidene, isopropylidene or trimethylene.

13. The cyclopentane derivative of claim 11 wherein $R^6$ is phenyl, 1-naphthyl, 2-naphthyl, 2-,3- or 4-chlorophenyl, 4-bromophenyl, 2-,3- or 4-fluorophenyl, 2,3-, 2,4-, 2,5-, 2,6-, 3,4- or 3,5-dichlorophenyl, 2-,3- or 4-tolyl, 2,3-, 3,4- or 3,5-xylyl, 4-t-butylphenyl, 2-, 3- or 4-methoxyphenyl, 3-trifluoromethylphenyl, 2-chloro-4-methylphenyl, 1-chloro-2-naphthyl, 4-chloro-2-naphthyl, 6-methyl-2-naphthyl or 6-methoxy-2-naphthyl.

* * * * *